United States Patent

[11] 3,554,274

| [72] | Inventor | Friedrich W. Herfeld |
| --- | --- | --- |
| | | 1 Wall, 5982, Neuenrade, Germany |
| [21] | Appl. No. | 788,526 |
| [22] | Filed | Jan. 2, 1969 |
| [45] | Patented | Jan. 12, 1971 |
| [32] | Priority | Jan. 3, 1968 |
| [33] | | Germany |
| [31] | | No. 1,729,530 |

[54] HEATING AND COOLING MIXER FOR PREPARING PLASTIC MATERIAL
12 Claims, 8 Drawing Figs.

[52] U.S. Cl. ................................................. 165/65,
165/92, 165/109
[51] Int. Cl. ...................................................... F28f 13/12
[50] Field of Search........................................... 165/12, 14,
48, 65, 92, 86, 120, 109; 259/(U&C)

[56] References Cited
UNITED STATES PATENTS
| 1,341,287 | 5/1920 | Somerville................... | 165/92 |
| 1,949,374 | 2/1934 | Johnson....................... | 165/92 |
| 2,639,898 | 5/1953 | Reich........................... | 165/92 |

Primary Examiner—Charles Sukalo
Attorney—Allison C. Collard

ABSTRACT: A heating and cooling mixing device consisting of a heating mixer for heating the plastic material rapidly, and a cooling mixer for subsequently rapidly cooling the material under an almost continuous operation. The centrifugal heating-mixing apparatus contains a three-step mixing device for achieving a homogenous and fast mixing, as well as fast heating. The cooling mixer is also a centrifugal mixer and includes on the driving shaft, a plurality of cooling rings. Cooling means also flow through the jacket of the device. Within the cooling mixer, helically formed lines are provided at the outside ends of the mixing fans which effect an intensive flow of the mixed plastic material within the range of the walls of the device. The cooling rings and the mixing fans may be provided singularly, or all together. This provides a large warming transfer face with a large relative movement of material so as to create a device having a high cooling power.

PATENTED JAN 12 1971

INVENTOR.

FRIEDRICH WALTER HERFELD

BY *(signature)*

INVENTOR.

FRIEDRICH WALTER HERFELD

BY

INVENTOR.

FRIEDRICH WALTER HERFELD

HEATING AND COOLING MIXER FOR PREPARING PLASTIC MATERIAL

This invention relates in general to a heating and cooling device for a material.

More specifically, this invention relates to a heating and cooling device for mixing and preparing plastic materials, and, particularly for preparing plastic materials for further processing so that the mixture is heated together with the added material to the point of plasticizing the mixture.

Accordingly, the present invention provides a heating and cooling mixing device which operates almost continuously, i.e., the charging times should be done in short periods in succession to process the material further. The various connected parts of the entire device should coincide with each other in a such a way that both the heating and cooling cycles require the same time, so that the total device can be used to its fullest capacity. The invention also both homogeneously mixes the plastic mixture, and cools the mixture evenly.

The apparatus of the invention includes a centrifugal heating mixer having an outlet nozzle which is controlled by a slide. Below the outlet nozzle, a centrifugal cooling mixer is provided having a jacket through which a cooling media is guided. The outlet nozzle of the heating mixer also serves as a charging nozzle. Moreover, an outlet nozzle of the cooling mixer serves to release the finished mixture by means of a controlled slide. Thus, by using known centrifugal mixing devices, short mixing and cooling times may be achieved.

A further embodiment of the invention provides that the heating mixer has a three-step mixing device which is mounted on a shaft which is guided through its bottom wall. The lower mixing fan of the three-way mixing device moves the mixed material upwardly. The upper mixing fan pushes the mixed material downwardly. The center mixing fan, has oppositely arranged sections so that the inner sections move the mixed material downwardly while the outer sections move the mixed material upwardly. In still a further embodiment of the invention, the cooling mixer is provided with central centrifugal mixing fans at its bottom. These fans are provided on the outer ends thereof with upwardly directed helically formed cam fans. The outside edges of the fans run in the immediate vicinity, and parallel to the wall of the mixing device. In this way, a particularly intensive flow of the mixed material is activated in the immediate wall of the mixing device so as to provide intensive heat transfer and intensive cooling to the mixture.

It is therefore an object according to the present invention to provide an improved heating and cooling mixer for preparing plastic material.

It is another object according to the present invention to provide an improved heating and cooling mixer which is capable of heating and cooling plastic material rapidly in an almost continuous process while it is being mixed.

It is still a further object according to the present invention to provide an improved heating and cooling mixer for plastic materials which is simple in design, easy to manufacture, and reliable in operation.

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention, as to which reference should be made to the appended claims.

In the drawings, wherein similar reference characters denote similar elements throughout the several views.

Figure 1:
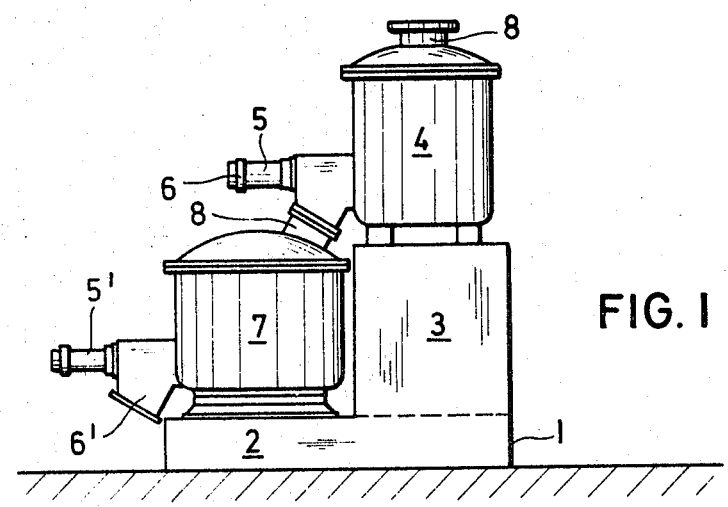
FIG. 1 is a schematic view of the heating and cooling device in accordance with the invention.

Referring to FIG. 1, the heating and cooling mixer includes a frame 1 having a bottom member 2 and 3 with different heights. The upper bottom portion 3 carries a heating mixer 4 with an outlet nozzle slide 5, and an outlet nozzle 6. The lower bottom portion 2 supports a cooling mixer 7 and also includes an outlet slide 5', and an outlet nozzle 6' to permit a discharge of the cooling mixer onto either a conveyor belt, a transport device, a storing container, or immediately into the charging funnel of an extruder. Bottom portions 2 and 3 have driving devices (not shown) whereby the driving shafts are guided from below through the mixing container of heating mixer 4, and cooling mixer 7. Above heating mixer 4, a charging device is provided (not shown) which fills heating mixer 4a via a discharging nozzle 8.

Figure 2:
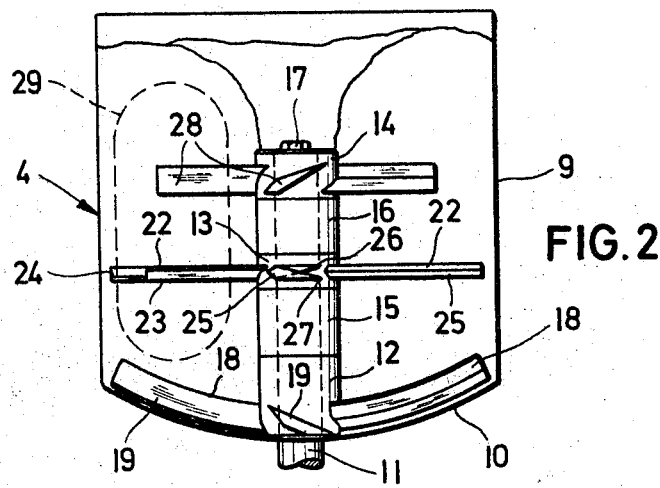
FIG. 2 is a view of the heating mixer showing a cutout of the jacket of the wall of said heating mixer.
Figure 3:
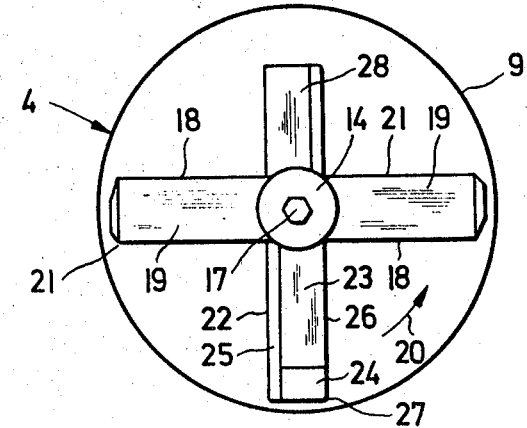
FIG. 3 is a horizontal plan in accordance of the embodiment of FIG. 2 showing the various forms of the mixing fan.

Details of the heating mixture 4 are shown in FIGS. 2 and 3. Heating mixer 4 comprises a cylindrically formed jacket 9, as well as a raised bottom wall 10. The jacket of the device and, if so desired, the bottom wall are formed as a double jacket, and can provide for the flow of a heating media, or the adoption of a heating element, which is not shown in detail. A driving shaft 11 is guided centrally through bottom wall 10. Secured to shaft 11 by means of screw 17 on the inner side of the mixing device 4 are hub pieces 12, 13, and 14, as well as spacer pieces 15 and 16.

If desired, a keyed joint (not shown) may be provided between the hub and spacer connections and/or the driving shaft, so that the total arrangement of the mixing tools can be connected actively with the driving shaft.

The lower hub piece 12 carries two or more lower mixing fans 18 which extend substantially across the total face of the bottom wall 10 and are adjusted to match the profile of bottom wall 10. The distance between mixing fans 18 and bottom wall 10 is maintained extremely small. The upper side 19 of lower fan 18 runs upwardly against the rotational direction 20 of the mixing device. On the front side, its upper face 19 tapers into a sharp mixing edge 21. Mixing edges 21 move substantially about the bottom of the mixing device 4 during the movement of lower fans 18. The lower fans 18 are shown in a left and right direction in FIG. 3. Preferably two diametrically opposite lower fans 18 are shown. It is also possible to provide three or four lower fans equally spaced in the circumferential direction.

The center hub piece 13 carries two or more center fans 22 which consist of two opposed folded pieces or section 23 and 24. Each of the center fans 22 consist of a back beam 25 onto which are mounted the inner section 23 and the outer section 24. These sections are each provided with a key-shaped profile so that the edge of the key profile of the inner pieces 23 is located above the circumferential plane of center fan 22. Moreover, the key edge 27 of outer piece 24 is located beneath the circumferential plane of center fan 22. In FIG. 3, the center fan is shown directed downwardly. When it rotates in the direction of arrow 20, the underside of inner piece 23 which runs upwardly in the moving direction, causes a downward movement of the mixed material, while the upper side of outer piece 24 is turned downwardly in the moving direction so as to provide an upward movement of the mixed material. Center fans 22 extend substantially across the whole width of the mixing device 4. Inner piece 23 however is substantially longer than outer piece 24.

The upper hub piece 14 carries two or more fans 28 one blade of which is shown in FIG. 3 in a horizontal view in an upward direction. Upper fans 28 have a substantially symmetric profile so that the longitudinal plane of the profile is turned upwardly in the direction of movement. Upper fans 28 therefore effect a downward movement of the mixed material. The length of upper fans 28 is substantially shorter than the radius of mixing container 4 so that there is no interference during the upward movement of the mixed material along the wall of said mixing container.

Figure 4:
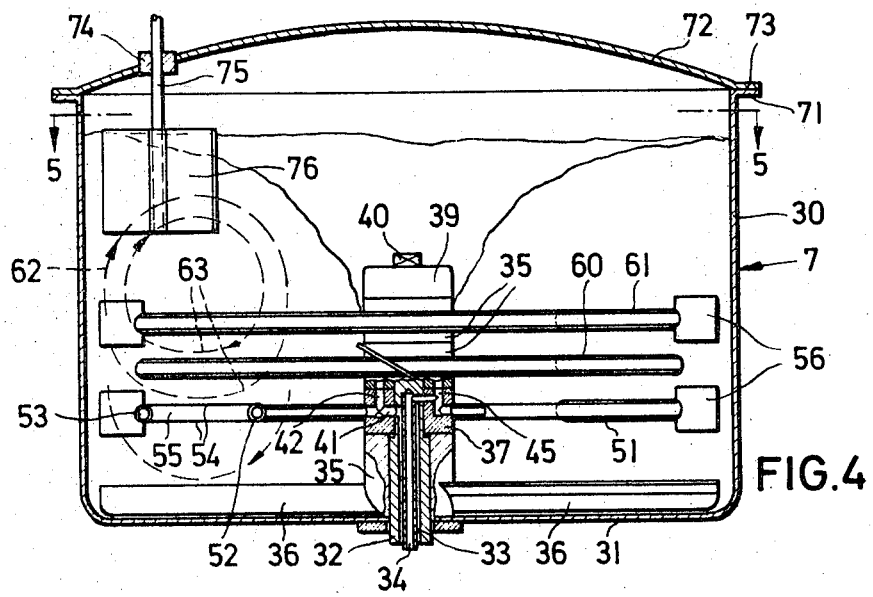
FIG. 4 is a view partly in cross section of the cooling mixer.
Figure 5:
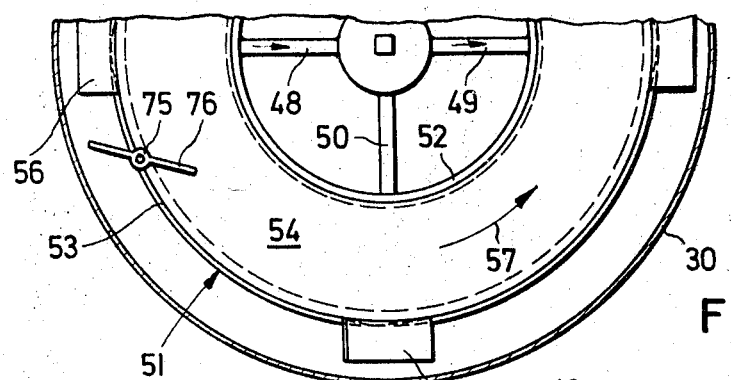
FIG. 5 is a cross-sectional view taken along line 5–5 of FIG. 4.
Figure 6:
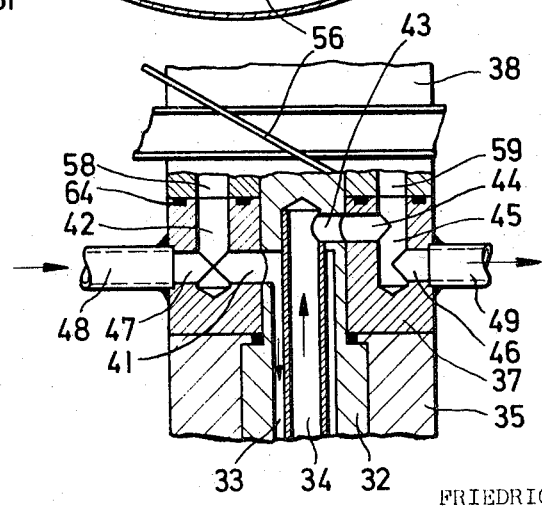
FIG. 6 is an enlarged detail view of FIG. 4 showing details of the driving shaft.

During the operation, container jacket 9 is heated. Moreover, there is a marked increase of heat due to the friction of the mixing tool. Lower fans 18 act as a centrifugal mixing fan, so that a rotary flow is created inside of heating mixer 4. The center fans support this rotary flow in that the outer pieces 24 support the upward movement of the flow, and the inner pieces 23 support the downward movement of the flow. The center fans support to a high degree the rotary movement, since both the upward as well as the downward movement is supported. It is a particular advantage that the inner piece and the outer piece are pitched oppositely toward each other, so that the axially created forces are neutralized with respect to each other. Upper fans 28 support the downward movement of the mixed material. Therefore, in accordance with the invention of the three-way mixing device, a very homogeneous and intensive mixing of the plastic material is achieved, so that the individual ingredients as well as the added material is intensively mixed and brought to the necessary heat temperature for plasticizing. The hub pieces 15 and 16 are exchangeable so that the individual fans in the mixing device may be arranged at different heights. This permits the fans to be arranged in accordance with a different charging degree of the heating mixer. Another advantage is that the height of the fans may be adjusted in accordance with the type of material to be mixed. As soon as a satisfactory mixture is achieved within heating mixer 4, the heating mixer can be discharged by means of outlet slide 5 into cooling mixer 7. The details of the construction of the cooling mixer are shown in FIGS. 4—6. The cooling mixer 7 also comprises a cylindrical jacket 30, as well as a bottom wall 31, which may also be constructed as a double wall so as to permit a cooling media to flow. Cooling mixer 7 has a larger capacity than heating mixer 4. A driving shaft 32 is guided through the wall of bottom portion 31. This shaft is constructed in form of a hollow shaft and includes a pipe 34 concentrically positioned therein. A hub piece 35, preferably supporting four mixing blades 36 is rigidly mounted onto drive shaft 32. Mixing blades 36 run adjacent to bottom wall 31, and serve as centrifugal blades for the contents of the mixture. Furthermore, hub pieces 37 and 38 are mounted onto driving shaft 32. An end piece 39 is also mounted on drive shaft 32. A screw connection member 40 maintains the aforementioned hub pieces secured on drive shaft 32. Key connections are provided between the single hub pieces and/or the drive shaft 32. Drive shaft 32 may also include a multiple-edged outer profile. Moreover, the inner profile of the hubs also includes a plurality of edges. This provides a distortion safe connection between the driving shaft 32 and the hub pieces.

The inner channel 33 of drive shaft 32 terminates adjacent to lower hub piece 37. A transverse channel 41 is connected with the inner channel 33. This cross channel is also connected with hub piece 37. A longitudinal channel 42 intersects transverse channel 41. Pipe 34 extends axially beyond the front face of inner channel 33 and continues into transverse channel 43. A further cross channel 44 of hub 37 leads into cross channel 43. A longitudinal channel 45 intersects cross channel 44. A cross channel 46 leads directly to the outside and substantially to the center of hub 37. Cross channel 41 extends into a cross channel 47 which is located opposite cross channel 46. Radial arms 48 and 49 are provided as extensions for cross channels 47 and 46, and are connected with hub 37. These radial arms are constructed as pipes. Hub 37 is provided with further radial arms 50, preferably four in number, which are in an opposite position of 90° with respect to each other. These additional radial arms do not connect with any of the other channels which are in contact with hub 37. Therefore, they may be arranged in any preferred way. The four radial arms of the hub carry a cooling ring 51, which consists of an inner ring pipe 52, an outer ring pipe 53, and two ring plates 54. These parts are tightly connected with each other (preferably welded together) so that a right angular transverse section 55 is obtained within cooling ring 51. Rings pipes 52 and 53 serve only to support the cooling ring, and do not serve to guide the cooling media therethrough. Radial arms 48 and 49 are guided through ring pipe 52 and extend into ring channel 55. The connections between the radial arms 48, 49 and 50, hub 37, and cooling ring 51 are preferably welded together. Mounted on the outside of the cooling rings are mixing blades 56 which, in accordance with the invention, move in the direction of arrow 57 so as to carry the material to be mixed upwardly. Hubs 38 are constructed similar to hubs 37. Within hubs 38, longitudinal channels 58 and 59 serve to connect with longitudinal channels 42 and 45. Furthermore cross channels are provided which are in connection with further radial arms for cooling rings 60 and 61. The only difference between hubs 37 and 38 is that hub 37 has a connection with the inner pipe 33 and pipe 34, while the flow of the cooling media flows into the other hubs 38 via longitudinal channels 42, 58, and 45, 59. Cooling rings 60 and 61 have the same construction as cooling ring 51. The longitudinal channels are tightened between the hubs by means of O-rings 64. Pipe 34 feeds cooling media into radial arm 49, and then subsequently into cooling ring 51 The backflow of the cooling media is performed from cooling ring 51 through radial arm 48, and inner channel 33. A rotating stuffing box (not shown in detail) guides the cooling media to inner channel 33 and pipe 34. The container jacket 30 terminates on its upper edge in a flange 71. A lid 72 includes a corresponding lid flange 73. Flanges 71 and 73 are joined to each other in any suitable manner. Adjacent to the circumference of lid 72 is provided an inlet piece 74 including a pivotable arresting shaft 75. Arresting shaft 75 which is shown having a broken end at its upper portion, may be connected with a suitable adjusting means, which is not shown in the drawings. A platelike guide 76 of sheet metal is mounted on arresting shaft 75 and dips into and against the radial direction of movement of the mixed material. The inclination of metal guide 76 is designed so that the mixed material can be directed into the inside of the mixing container, so that the mixed material can be rotated in a radial direction. The inclination of metal guide 76 may be adjusted if desired. During the operation of the cooling mixer, mixing blades 36 create a rotational movement of the mixture as shown by arrows 62. Mixing blades 56 support the rotational movement of the mixed material. In this case the blades draw the material upwardly particularly within the range of container jacket 30. The turbulence in the range of the container jacket is increased, so as to contribute to the heat transfer of the mixed material. The mixed material is guided as shown by arrows 63, through the intermediate spaces of cooling rings 51, 60 and 61, so that a relative movement exists between the faces of the cooling rings, and the mixed material. A turbulence of the mixture is thus created in the range of the cooling faces.

Figure 7:
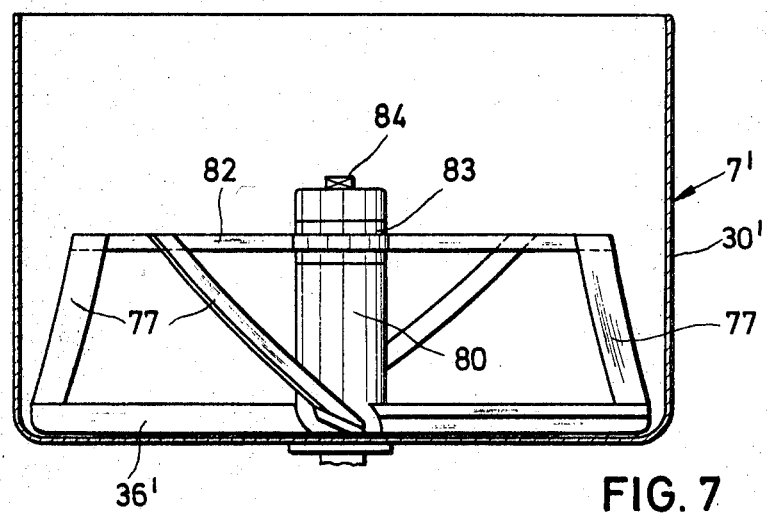
FIG. 7 is a view of a modified cooling mixer with its jacket cut out.
Figure 8:
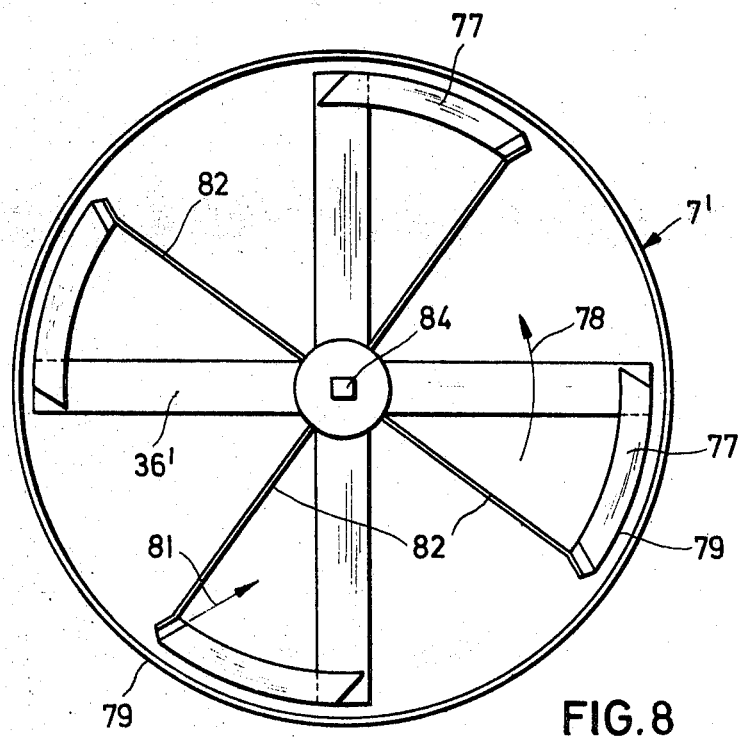
FIG. 8 is top plan view of the embodiment of FIG. 7.

FIGS. 7 and 8 show a modified version of the other embodiments and include a cooling mixer 7'. The bottom mixing blades 36'; which may consist of two or more blades, contain two cams 77 at the external end thereof. These cams are directed upwardly and against the rotating movement 78 of mixing blade 36'. The corresponding outer edge 79 of the cam is constructed helically and is adjacent to the wall of the mixing container. Cams 77 are of rectangular cross section. The cross section line 81, with respect to the radial direction, and with respect to the axis of driving shaft 80 is inclined in such a fashion that the inwardly pointed cross section 81 is inclined in view of the radial direction to rotational movement arrow 78. The outer side 79 is cutout on its back portion, that is, the outer smaller side is retracted onto the backside. To support the cams, supporting means 82 may be provided on the upper side thereof, and anchored in a hub piece 83 of drive shaft 80. However, these supporting means 82 are not required in any case. Supporting means 82 are connected with the cams by means of clamps, screws, or the like. Drive shaft 80 includes a front connection 84, for securing the hub to shaft 80.

Cams 77 provide an intensive flow in the range of outer wall 30' which is constructed as a hollow wall, and through which a cooling media is flowing. Cam blades 77 preferably lift the mixed material in the range of the outer wall 30'. The cam blades may be used instead of cooling rings as in FIGS. 4 or 6, or together with cooling rings. In the latter case, mixing blades 56 may be omitted. The cam blades extend at least one-third above the height of the mixing container. The ratio of length of the cam blades with respect to their width is 5:1. In accordance with the invention, the capacity of the cooling mixer is made larger than the capacity of the heating mixer. Therefore, it is possible to achieve an increase in the effectiveness of the actual cooling energy, since the inner face of the container jacket in the cooling mixer is larger. Accordingly, the diameter of the cooling rings is also larger, so that a larger cooling face is achieved. The rotational speed of the ends of the mixing blades in the cooling mixer is substantially lower than the corresponding rotational speed in the heating mixer. The above named rotational speeds are in the ratio of between ⅓ to 1/10.

The heating mixer has rotational speed of 20—40 m/sec., while the cooling mixer has rotational speed of 5 to 10 m/sec. By placing the lower mixing blades close to the bottom of the mixing device, the bottom of the device can be cleared of any material in the heating mixer, as well as in the cooling mixer apart from the mixing effect.

Therefore, while only a few embodiments of the present invention have been shown and described, it will be understood that many changes and modifications may be made thereunto, without departing from the spirit and scope of the invention as defined by appended claims.

I claim:

1. A heating and cooling mixing device for preparing material mixtures comprising;
   a centrifugal heating mixer having a slide control outlet nozzle coupled to one side thereof;
   a vertical three-way mixing device having a drive shaft coupled through its bottom wall;
   lower mixing blades secured to said drive shaft for moving the material to be mixed upwardly;
   upper mixing blades coupled to said drive shaft for moving the material to be mixed downwardly;
   center blades coupled to said drive shaft having oppositely arranged inner folds and outer folds so that the inner folds move the mixed material downwardly while the outer folds move the mixed material upwardly;
   a centrifugal cooling mixer coupled to said outlet nozzle and having a wall with a flow through cooling media, said heating mixer outlet nozzle serving as a charging inlet; and
   a slide control discharging nozzle secured to said cooling mixer for discharging the finished mixture.

2. The mixing device in accordance with claim 1, wherein said lower mixing blades are profiled to correspond to the bottom wall of the mixing container, said blades extending close to the bottom of said mixing container and close to the width of the container, whereby the upper surface of each of the lowermost blade is turned upwardly against its rotational movement.

3. The mixing device according to claim 1 wherein each of said center mixing blades comprises a back beam section, and oppositely attached folded inner and outer key parts, whereby the inner key edge is aligned above the circumferential plane of the outer blades and key edge of the outer key part beneath the circumferential plane of the center blade, said inner key part of each of the center mixing blade being longer than said outer key part.

4. The mixing device as claimed in claim 3 wherein said upper mixing blades cover between one-half and three-quarters of the width of the mixing containers of the lower side of each blade moving upwardly in rotational direction.

5. The mixing device according to claim 4 comprising hub pieces disposed axially on said mixing shaft and exchangeable spacer pieces disposed axially on said mixing shaft between said hub pieces for said mixing blades.

6. The mixing device according to claim 5, wherein said cooling mixer is mounted on a vertical drive shaft having centrifugal mixing blades above the bottom of the mixing container, and a plurality of cooling rings disposed above said mixing blades and carried on arms thereof so that said driving shaft as well as said arms serve as cool conducting guides.

7. The mixing device according to claim 6 wherein said mixing blades are mounted on the outerside of each of said cooling rings to that the said blades are directed upwardly.

8. The mixing device according to claim 7 wherein each of said cooling rings includes two ring plates, and an inner and outer ring pipe, said parts being connected to each other presenting a ring channel having rectangular diameter.

9. The mixing apparatus according to claim 8 comprising hubs for supporting each of said cooling rings, said hubs having internal radial arms with longitudinal channels positioned opposite to each other, said channels serving as cooling guides and feed backs for the cooling media, said longitudinal channels of each of said hubs being sealed with respect to each other wherein one of said radial arms cuts one of the corresponding hubs, said driving shaft includes concentric lead lines for guiding and feeding back the cooling media, said concentric lead lines being connected with the lowermost hub and longitudinal channels thereof.

10. The mixing apparatus according to claim 6 wherein said cooling mixer comprises centrifugal mixing blades disposed adjacent to the bottom thereof, said blades including its outer end thereof upwardly directed screwlike cams which are directed against the direction of rotation, the outside edges of which are parallel and adjacent to the wall of the mixing container.

11. The mixing apparatus according to claim 10, wherein the cross section which is pointed inwardly is inclined with respect to the radial rotation and includes a cutout on its back portion thereof.

12. The mixing apparatus according to claim 11 wherein the ratio of length with respect to width of the cam blades is at least 5:1.